United States Patent
Swaminathan et al.

(10) Patent No.: US 11,934,977 B2
(45) Date of Patent: Mar. 19, 2024

(54) DYNAMIC AND CONTINUOUS ONBOARDING OF SERVICE PROVIDERS IN AN ONLINE EXPERT MARKETPLACE

(71) Applicant: TASKHUMAN, INC., Saratoga, CA (US)

(72) Inventors: Ravi Swaminathan, Palo Alto, CA (US); Kartik Thumbavanam Padmanabhan, Fremont, CA (US)

(73) Assignee: TASKHUMAN, INC., Saratoga, CA (US)

( * ) Notice: Subject to any disclaimer, the term of this patent is extended or adjusted under 35 U.S.C. 154(b) by 0 days.

(21) Appl. No.: 17/266,972

(22) PCT Filed: Jul. 17, 2019

(86) PCT No.: PCT/US2019/042294
§ 371 (c)(1),
(2) Date: Feb. 8, 2021

(87) PCT Pub. No.: WO2020/033117
PCT Pub. Date: Feb. 13, 2020

(65) Prior Publication Data
US 2022/0058562 A1    Feb. 24, 2022

Related U.S. Application Data

(60) Provisional application No. 62/715,996, filed on Aug. 8, 2018.

(51) Int. Cl.
*G06Q 10/00* (2023.01)
*G06F 40/295* (2020.01)
*G06F 40/40* (2020.01)
*G06Q 10/0631* (2023.01)
*G06Q 10/0639* (2023.01)

(52) U.S. Cl.
CPC ... *G06Q 10/063112* (2013.01); *G06F 40/295* (2020.01); *G06F 40/40* (2020.01); *G06Q 10/06398* (2013.01)

(58) Field of Classification Search
CPC ............ G06Q 10/063; G06Q 10/0631; G06Q 10/06398; G06Q 10/06312; G06F 40/40; G06F 40/295
See application file for complete search history.

(56) References Cited

U.S. PATENT DOCUMENTS 10,459,997 B1 * 10/2019 Agarwal ............... G06Q 50/01
2009/0192945 A1    7/2009 Perpina
(Continued)

OTHER PUBLICATIONS

Rafiei, M., & Kardan, A. A. (2015). A novel method for expert finding in online communities based on concept map and PageRank. Human-Centric Computing and Information Sciences, 5(1), 1-18. (Year: 2015).*

(Continued)

*Primary Examiner* — William S Brockington, III
(74) *Attorney, Agent, or Firm* — Maschoff Brennan

(57) ABSTRACT

A system to generate and maintain a database of service provider skills and rankings with various categories is disclosed. Skills and rankings are generated from a number of corpus texts as well as service provider content. The database is dynamically updated to reflect changes to the corpus texts and/or service provider content.

16 Claims, 18 Drawing Sheets

(56) References Cited

U.S. PATENT DOCUMENTS

| | | |
|---|---|---|
| 2009/0271350 A1 | 10/2009 | Feng |
| 2010/0205541 A1* | 8/2010 | Rapaport ............... G06Q 30/02 |
| | | 715/753 |
| 2011/0238652 A1 | 9/2011 | Wolf-Soffer |
| 2012/0316916 A1 | 12/2012 | Andrews |
| 2013/0007009 A1* | 1/2013 | Caldwell ............... G06F 16/337 |
| | | 707/E17.014 |
| 2013/0110641 A1 | 5/2013 | Ormont |
| 2013/0275429 A1* | 10/2013 | York ..................... G06F 16/435 |
| | | 707/E17.002 |
| 2015/0169676 A1 | 6/2015 | Bohra |
| 2015/0269612 A1* | 9/2015 | Cucerzan ............... G06F 40/295 |
| | | 705/14.49 |
| 2015/0371173 A1* | 12/2015 | Jalali ..................... G06Q 20/027 |
| | | 705/7.14 |
| 2016/0196334 A1 | 7/2016 | Bastide |
| 2017/0017897 A1* | 1/2017 | Bugay ................... G06F 40/169 |
| 2017/0192827 A1 | 7/2017 | Ghafourifar |
| 2017/0249388 A1* | 8/2017 | Alonso .................. G06Q 10/06 |
| 2018/0081627 A1 | 3/2018 | Bajekal |
| 2018/0121496 A1 | 5/2018 | Hayes |
| 2018/0211174 A1* | 7/2018 | Allen ..................... G06N 20/00 |
| 2018/0300393 A1* | 10/2018 | Brandstetter ......... G06Q 30/0251 |
| 2019/0057310 A1* | 2/2019 | Olmstead ............... G06F 40/30 |
| 2019/0347327 A1* | 11/2019 | Patil ..................... G06F 16/951 |

OTHER PUBLICATIONS

Davoodi, E., Kianmehr, K., & Afsharchi, M. (2013). A semantic social network-based expert recommender system. Applied Intelligence, 39(1), 1-13. (Year: 2013).*

Sharma Natasha, "Zomato Web Scraping with BeautifulSoup in Python", DataScience+, May 23, 2018, pp. 1-6.

European Search Report Issued in corresponding application No. 19846433.1, dated May 12, 2022.

* cited by examiner

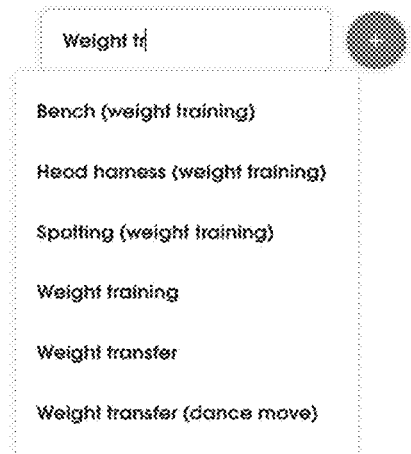

Figure 17

I worked out in running shoes for the longest time, and didn't really think twice about it. I figured what shoes I trained in couldn't really matter.

I was wrong.

A good lifting shoe is one that is light and has a thin, flat sole and adequate ankle and arch support, and it noticeably improves stability during exercises like Squats Deadlifts, Standing Presses, as well as the Olympic Lifts.

I've tried quite a few types of lifting shoes, and here are the ones I've come to like most:

ANALYZE ME

| Topic | Score |
|---|---|
| Deadlift | 1 |
| Sports | 0.932 |
| Physical exercise | 0.8864 |
| Hobbies | 0.7386 |
| Squat (exercise) | 0.7254 |
| Athletic sports | 0.7058 |

Figure 18

DYNAMIC AND CONTINUOUS ONBOARDING OF SERVICE PROVIDERS IN AN ONLINE EXPERT MARKETPLACE

PRIORITY TO PRIOR PROVISIONAL APPLICATION

Priority is claimed to Provisional Application Ser. No. 62/715,996, filed on Aug. 8, 2018, the entire content of which is hereby incorporated by reference in this application.

BACKGROUND AND SUMMARY OF THE INVENTION

In the present-day world, people rely on search engines and various review sites for numerous reasons. Whether it involves buying a house, starting a new business, working towards retirement or losing weight, people constantly use search engines to seek knowledge and advice. With the constant evolution of the digital age, web search engines and review sites inundate consumers with a deluge of information. For example, a simple query on 'losing-weight' results in millions of hits on search engines or hundreds of options in a review site, some of which may not be suitable for the knowledge seeker's particular situation or may be incomplete, leaving the knowledge seeker with further follow-up questions. In situations like these, it's more effective to use a human provider (or a Subject-matter expert) to help educate knowledge seekers with the answers to their questions.

With the ever-growing popularity of online marketplaces, it's now possible for the knowledge seeker (hereinafter "consumer") to instantly get connected to a subject matter expert (hereinafter "service provider" or just "provider") to talk about and take action on a particular topic that the consumer is interested in. However, most of these marketplaces still have a lot of friction in serving consumers and providers alike. For example they only serve a particular category of Human providers (e.g. doctors, mechanics, psychics, etc.) and connecting the consumers and the service providers are cumbersome and involve a tedious process of consumers having to fill in a series of questions presented to them in order to meet the requirements to direct the consumer to the relevant provider.

Currently, there is no online marketplace for service providers that not only connects consumers to the service providers via bi-directional video/audio through a single input mechanism or directly from a topical search engine that intakes consumer queries and directs consumer to the relevant service providers, but also provides a vehicle to add new topics of expertise as the service provider knowledge base and the number of service providers grows. Humans are continuous learners and even experts update their knowledge with the latest findings in their field and other information close to their field of expertise. For example, a Dietician keeps up to date with the current state of his/her art, the practices and emerging sciences related to 'Diets and Nutrition' as well as supplementary topics such as 'Stress' or 'Physical Exercise'. A Soccer coach keeps up to date on all major happenings around his/her sport as well as information about other sports/activities that his/her players might benefit from trying. Once the service provider feels comfortable claiming expertise in a new topic, they may be able to add that to their profiles with ease. For this, there exists a need for an online repository that's current with the present state of expertise for human service providers in the world. Aspects of the present disclosure help fill this need.

Additionally or alternatively, a current problem among conventional sites that offer expert advice for a variety of topics is that such conventional sites include an on-boarding process of service providers that is cumbersome and involves a tedious process of having them fill out an online form about their topics of expertise and social tags of expertise, upload their resume, or write about the skills they are interested in consulting on. Thus, conventional on-boarding processes are often subjective by allowing for puffery and potential exaggeration or other inaccuracies with regards to a skill set of the service provider. Additionally, conventional on-boarding processes may be time-consuming and a potential deterrence to qualified and willing service providers that may otherwise on-board.

Aspects of the present disclosure may be directed to solving the above-described example problems. For example, a technical solution rooted in computer technology and the internet may include scraping information from professional sites/blogs and social media sites like Twitter, Instagram, and LinkedIn. Additionally or alternatively, the technical solution may include using natural language processing techniques like topic modeling and named entity recognition. These techniques may enable providers to onboard into these marketplaces without having to write pages and pages of information.

Also part of the technical solution is to go as granular as possible while presenting these discover topics to the user. The system may be capable of not only identifying experts and displaying discover topics on higher level categories like Bodybuilding, Yoga etc. but also being able to go more granular and present them as discover topics. For example a discover topic could be a Bodybuilding supplement (instead of bodybuilding) or Iyengar Yoga (instead of Yoga) and identify providers in the system who are subject matter experts in bodybuilding supplements or Iyengar Yoga respectively. The subject matter expertise may again be determined by the providers' past engagement with the system and the information extracted from the providers' social media feeds or other public or private data shared by service provider or collected about service provider from third party companies and may rank them appropriately. The system may maintain an internal graph structure to define various parent and child relationships (for example Asana yoga being a child of parent category Yoga) and may maintain a data structure containing service providers in all of those parent-child categories.

The subject technology is illustrated, for example, according to various aspects described further below. These are provided as examples and do not limit the subject technology. It is noted that any of the embodiments may be combined in any combination, and placed into a respective independent embodiment. The following is a non-limiting summary of some examples presented herein:

According to aspects of the present disclosure, we may extract the social media feeds to gather the topics of expertise to onboard a provider in a marketplace setting. As and when these service providers update their social media pages, we may either update the threshold score measuring the knowledge of topic in a particular subject or add new topics of expertise in their database of topics.

In contrast to conventional methods, we may use transcript calls from past interactions between service providers and consumers to create new topics of expertise and add to the provider's existing database of skills. Additionally or alternatively, conventional methods may be dependent on identifying the expertise skills of an expert through social media feeds and direct a search query to a list of providers based on their mentions of the search query in the service providers social media feeds. For example if the search phrase during the online processing phase is "Green tea for weight loss", conventional methods may identify the service providers based on the amount of media feed they have on this subject. Conventional methods may use the social media feeds as a way of gathering various domains of their expertise based on amount on social media in those consecutive domains, which further is used in an online processing system like search.

Additionally or alternatively, conventional methods may use direct correlation of a service provider's expertise on a topic based on the expert's social media footprint. There are two underlying issues to this assumption when we apply into an online marketplace settings. First, it's not unusual to have cases where a popular service provider may not have an active social media presence. He/she may not update their social feeds periodically due to their busy lives. There are also many cases where a service provider may not have any social media visibility but may be a well renowned subject-matter expert in their own fields.

In our onboarding process that's applicable for online marketplace, if a particular service provider does not have a social media presence, we may provide an ontology containing various topics of expertise in which a provider can choose to enroll. For example when a provider chooses to add weight training, we may trigger an autocomplete service to fill in the topic of expertise. See FIG. 17 for more details.

We may use various corpuses (Wikipedia, MeSH, etc.) to fill in these topics of expertise. Each topic of expertise may be a valid page in Wikipedia or other corpuses. For example in the above example Bench (weight training) refers to following page: https://en.wikipedia.org/wiki/Bench_(weight_training), and Weight training refers to the following page: https://en.wikipedia.org/wiki/Weight_training.

In some embodiments, there may be an advantage of using existing online corpuses to complement skills for a service provider with these ontologies. As and when we get more footprints (example call records) from the service providers in our platform, we can continuously map these ontologies to their skills obtained from these footprints and onboard them continuously.

Some conventional methods may collect various keywords from the social media post of a service provider (expert) and may use techniques like clustering to create various domains of expertise along with the keywords that appear on the domain.

In some embodiments, we may neither extract keywords nor use clustering. Rather, in some embodiments, we may extract out the social media feeds of service providers and use natural language techniques to extract out the named entities and map these entities to a valid Wikipedia page. This is illustrated in our demo app: http://aidemos.taskhuman.com/app2. For example one of our providers is a brand name: muscleforlife.com. Say our algorithm is reading out their following social media feed: https://www.muscleforlife.com/recommendation/equipment/ and we try to analyze the segment containing "WORKOUT SHOES". When we paste this text segment in our NLP entity analyzer, the following topics of expertise with their relevant scores may yield as shown in FIG. 18.

Each of the topics from the output of content analyzer may map to a valid Wikipedia entry. For example Deadlift has its page at: https://en.wikipedia.org/wiki/Deadlift. By not clustering and applying a structured wiki corpus to do the entity mapping and extracting out the service category skills provides aspects of the present disclosure with better advantages over conventional methods. A known corpus like Wikipedia has a structure when it comes to ordering of pages. For example each page may be associated to a category name and each category has sub-categories and so on. If you skim down to the page title of: https://en.wikipedia.org/wiki/Deadlift, you can see the category that the page appears on.

If we download the entire Wikipedia corpus from media wiki servers (it's available under creative commons license), all the pages and subpages may be organized in a large category tree hierarchy (also known as Knowledge Graph). This provides us something that conventional methods or any current expert marketplaces do not offer, an example of which is shown in FIG. 19.

An example Wikipedia category structure to the page "Yoga" is shown in FIG. 20.

Since Chakras is a subcategory of Yoga, and say in our marketplace that we do not have any service providers on the category Chakras, we can traverse our knowledge graph to find providers in Yoga. In other words, we can redirect questions like "I would like to learn about Chakras" in absence of a provider specializing in all chakras to providers who are Yoga experts.

By mapping the social media feeds (e.g., in some cases all social media feeds), and other metrics like call transcripts in an expert marketplace platform to a predetermined hierarchical corpuses like Wikipedia, we can create a knowledge graph of providers' expertise where each subcategory may represent a small domain to its parent category (example Bodybuilding supplement is a subcategory of Bodybuilding).

Conventional methods may include explicit feedback from providers' social media pages (for example, tweets, retweets, mentions on a hashtag) to measure the expertise of a service provider in the area in which the provider tweeted. We in our platform may use both explicit and implicit feedbacks from providers and users (for example a provider's footprint in the mobile application, the amount of time spent in platform, brand usefulness (bias towards popular brands), the feedback of a user to provider based on a particular discover topic or query posed in the search platform, sentiment analysis, etc. in addition to above explicit feedback mentioned. In addition to determining provider ranking, we may use more advanced algorithms in recommendation systems (for example a Factorization Machine) to calculate the expert knowledge in a particular area of expertise.

We can leverage our knowledge base to educate or send more personalized newsletters (recommendation engine) in place. For example using the knowledge graph example below, we can provide Yoga experts with news articles related to their categories or subcategories (for example an article on Tantra or Baba Ramdev for a Yoga expert). On the same lines, we can leverage existing graph based algorithms to train and evaluate a Yoga provider who does not blog or talk about Vinyasa Yoga into this subcategory Vinyasa Yoga. We could also leverage marketplace to engage these general platform experts (like Yoga experts) to connect to more specialized individuals to help them certify on the Vinyasa techniques.

Corpuses like Wikipedia add 1000 s of pages in their site every day. Reference: https://en.wikipedia.org/wiki/Wikipedia:Recent additions. For example the following pages were added in Jul. 31, 2018.

31 Jul. 2018 [edit]

00:00, 31 Jul. 2018(UTC)

... that the Donald Trump baby balloon was flown over London's Parliament Square and Edinburgh's the Meadows (pictured)?

... that since Brett Cantor's fatal stab wounds 25 years ago today were similar to those of Nicole Brown Simpson and Ron Goldman, O. J. Simpson's defense team was allowed to review the police case file?

... that Gevninge, a Danish village dating to the Viking Age or earlier, may have been the port for the seat of the Scylding kings?

... that Kateryna Kasper appeared at the Los Angeles Opera as Belinda in Purcell's Dido and Aeneas, staged by Barnie Kosky, and in Frankfurt as Antonida in Glinka's Iwan Sussanin, staged by Harry Kupfer?

... that Sigmund Freud regularly played the popular Austrian tarot card game, Königrufen?

... that William Chong Wong, the son of Chinese immigrant parents, twice served as Minister of Finance in Honduras?

... that Dafydd Gibbon is particularly concerned with endangered languages and has received awards from the Ivory Coast, Nigeria, and Poland?

... that the peanut worm *Nephasoma minutum* has been referred to as "taxonomic wastebasket"?

By creating a named entity on these pages by reading out the contents in the platform and by using popular NLP models, we can very quickly (e.g., almost immediately) add these new pages as a separate category in the system which we can support almost immediately in the external world. We can compare these entities with the social media feeds (for example talking about Sigmund Freud in their social media page) as their topic of expertise based on how much they spoke about that person in their feeds (continuous onboarding use case).

With conventional methods, this may prove difficult and instead may evolve their domains of expertise over a period of time. In contrast, aspects of the present disclosure may enable service providers to do so very quickly (e.g., almost instantly) in our platform.

Most of the service providers support only general categories like Yoga, Muscle building, House cleaning services. By creating the knowledge graph of experts based on category/subcategory hierarchy, we may go more granular in vetting out the experts (for example we may not connect a user who wants to learn about Iyengar yoga provider but we go more granular in connecting that user to a Iyengar yoga provider).

Most of the existing expert marketplaces enable 1x1 conversation between a knowledge seeker (Consumer) and an experienced provider (Provider) in topics such as health and fitness, personal finance, tax planning, vacation & travel, among other areas. However, the onboarding process by which the providers give proof of their expertise is rather cumbersome where a provider is typically presented with a long questionnaire to assess their skills. This appears inconsistent with the increasing usage of social media sites like Instagram, Twitter, Facebook and other microblogging platforms, from which it is now possible to analyze these texts and use information retrieval techniques to map said texts to the categories which they represent.

The expert marketplace as the type of ecommerce platform where expert consulting is provided by multiple third parties individuals, a cohort or organization as a whole and/or where transactions are processed by the marketplace provider. Consumers are connected to the experts through some media such as search engines or through recommendation systems and can directly contact to those providers via channels not limited to desktop, mobile or web. Onboarding is a mechanism by which these providers are recruited by the platforms to provide their expertise to the users in the platform. Onboarding may involve the process of selection, evaluation and ranking of providers.

BRIEF DESCRIPTION OF THE DRAWINGS

FIG. 17 is a snapshot of an autocomplete service to fill in a topic of expertise FIG. 18 shows when a text segment is pasted into the NLP entity analyzer, the topics of expertise with their relevant scores may yield as shown.

DETAILED DESCRIPTION OF THE INVENTION

Figure 1:
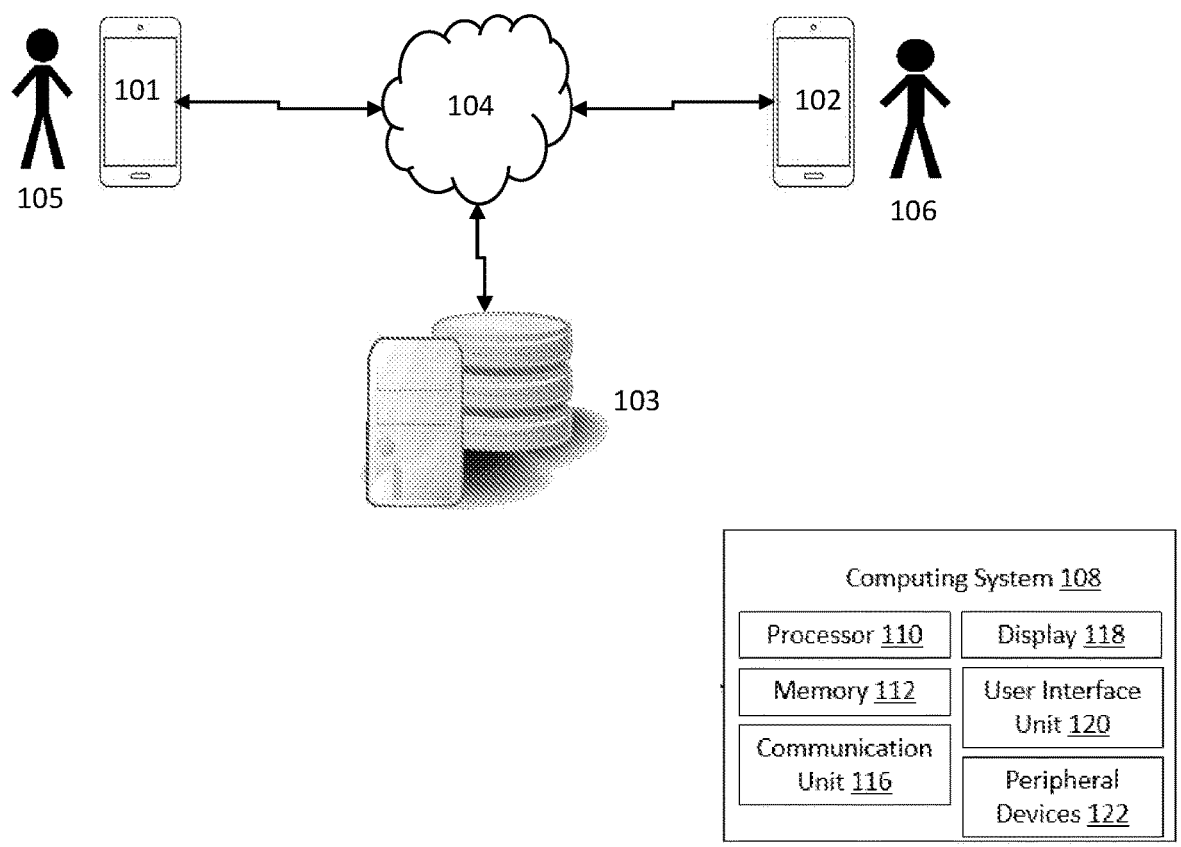
FIG. 1 shows an overview of the current system

FIG. 1 shows an overview of the current system. Consumer 105 uses consumer computer system 101. Service provider 106 uses service provider computer system 102. Consumer computer system 101, service provider computer system 102, and server computer system 103 are communicatively coupled through network 104. Each of consumer computer system 101, service provider computer system 102 and server computer system 103 are separate instances of computing system 108 with different amounts and types of each of the contained resources: processor 110, memory 112, communication unit 116, display 118, user interface unit 120 and peripheral devices 122 which are themselves operatively coupled. For example, server computer system 103 may not need display 118 or user interface unit 120 and thus they may not be present. In some embodiments network 104 is an Internet Protocol (IP) packet-based network. Each of the three computer systems (101, 102 and 103) are executing application programs (not shown) that contain the instructions to participate and perform the operations described herein. As is well-known, the three application programs could be instances of a common application program each configured with for the individual behavior or separate programs each dedicated to the relevant behavior. In the full system there are one or more consumers 105 each with a separate consumer computer system 101 and one or more service providers 106 each with a separate service provider computer system 102 (not necessarily the same number of each), but these are omitted for clarity.

For descriptive clarity, this specification will often refer to actions of computers systems where it is understood that these computer systems are operating according to the instructions of the corresponding application program.

Generally, the processor 110 may include any suitable special-purpose or general-purpose computer, computing entity, or processing device including various computer hardware or software modules and may be configured to execute instructions stored on any applicable computer-readable storage media. For example, the processor 110 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 1, it is understood that the processor 110 may include any number of processors distributed across any number of networks or physical locations that are configured to perform individually or collectively any number of operations described in this disclosure. In some embodiments, the processor 110 may interpret and/or execute program instructions and/or process data stored in the memory 112. In some embodiments, the processor 110 may execute the program instructions stored in the memory 112.

For example, in some embodiments, the processor 110 may execute program instructions stored in the memory 112 that are related to, for example, managing in real time the avail ability of service providers, and/or may perform or direct the performance of the operations associated therewith as directed by the instructions. In these and other embodiments, instructions may be used to perform one or more operations of any method or figure of the present disclosure.

The memory 112 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 110. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 110 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

The communication unit 116 may include any component, device, system, or combination thereof that is configured to transmit or receive information over network 104. In some embodiments, the communication unit 116 may communicate with other devices at other locations, the same location, or even other components within the same system. For example, the communication unit 116 may include a modem, a network card (wireless or wired), an infrared communication device, a wireless communication device (such as an antenna), and/or chipset (such as a Bluetooth device, an 802.6 device (e.g., Metropolitan Area Network (MAN)), a Wi-Fi device, a WiMax device, cellular communication facilities, etc.), and/or the like. The communication unit 116 may permit data to be exchanged with any devices or systems described in the present disclosure.

The display 118 may be configured as one or more displays, like an LCD, LED, or other type of display. The display 118 may be configured to present video, text, numbers, consumer interfaces, and other data as directed by the processor 110.

The user interface unit 120 may include any device to allow a consumer to interface with the computing system 108. For example, the user interface unit 120 may include a mouse, a track pad, a keyboard, buttons, and/or a touchscreen, among other devices. The user interface unit 120 may receive input from a consumer and provide the input to the processor 110. In some embodiments, the user interface unit 120 and the display 118 may be combined.

The peripheral devices 122 may include one or more devices. For example, the peripheral devices may include a sensor, a microphone, and/or a speaker, among other peripheral devices. In these and other embodiments, the microphone may be configured to capture audio, e.g., audio from a consumer in the form of a search query. The speaker may broadcast audio received by the computing system 108 or otherwise generated by the computing system 108.

System Overview

Figure 2:
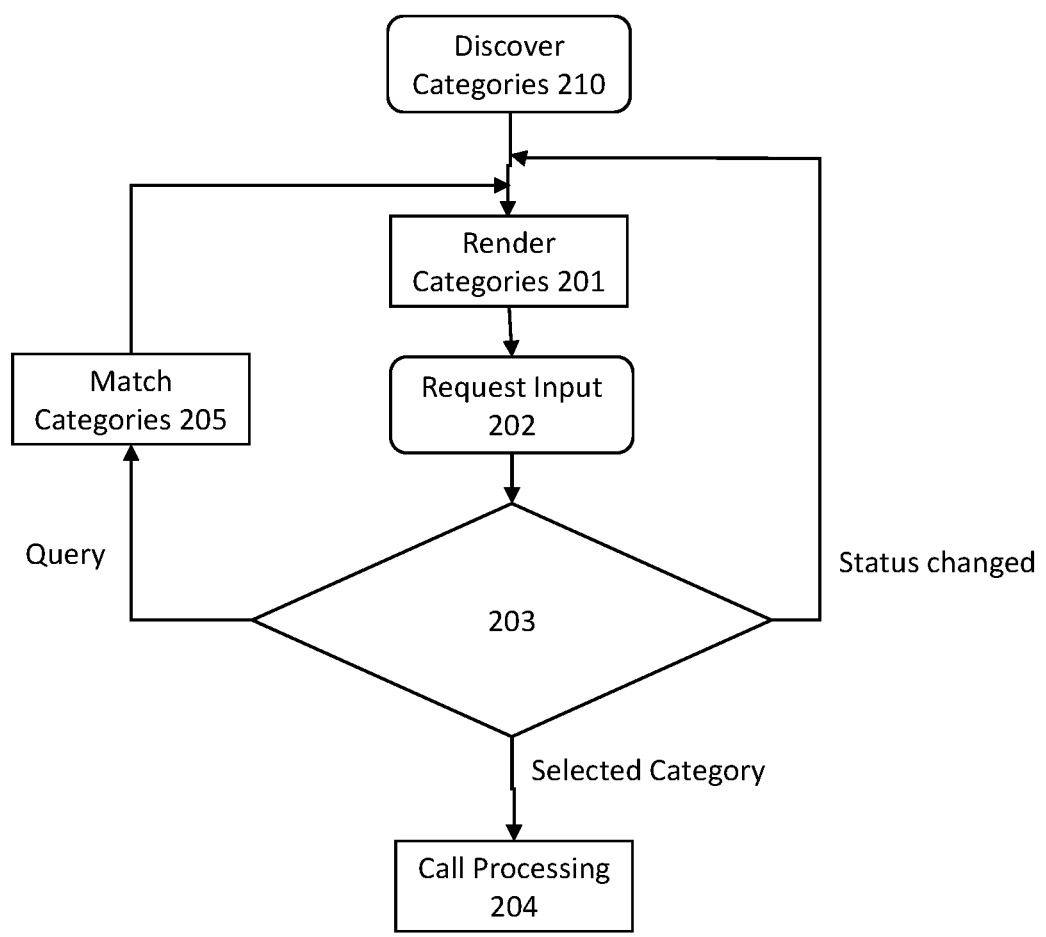
FIG. 2 shows an overview of the method of the current system.

Turning to FIG. 2, an initial set of categories is determined by the discover categories step 210. Those categories are presented to consumer 105 by render categories step 201 (see below). Input is requested from consumer 105 in step 202.

If the consumer input is a search query then the match categories step 205 converts the query into the set of categories and the system proceeds to the render categories step 201.

If the consumer input is the selection of a specific category then the system proceeds with the call processing step 204.

While waiting for a consumer input the system may detect that a status has changed whereupon it will terminate waiting for consumer input and proceed to render categories step 201.

Match Categories (205)

Figure 3:
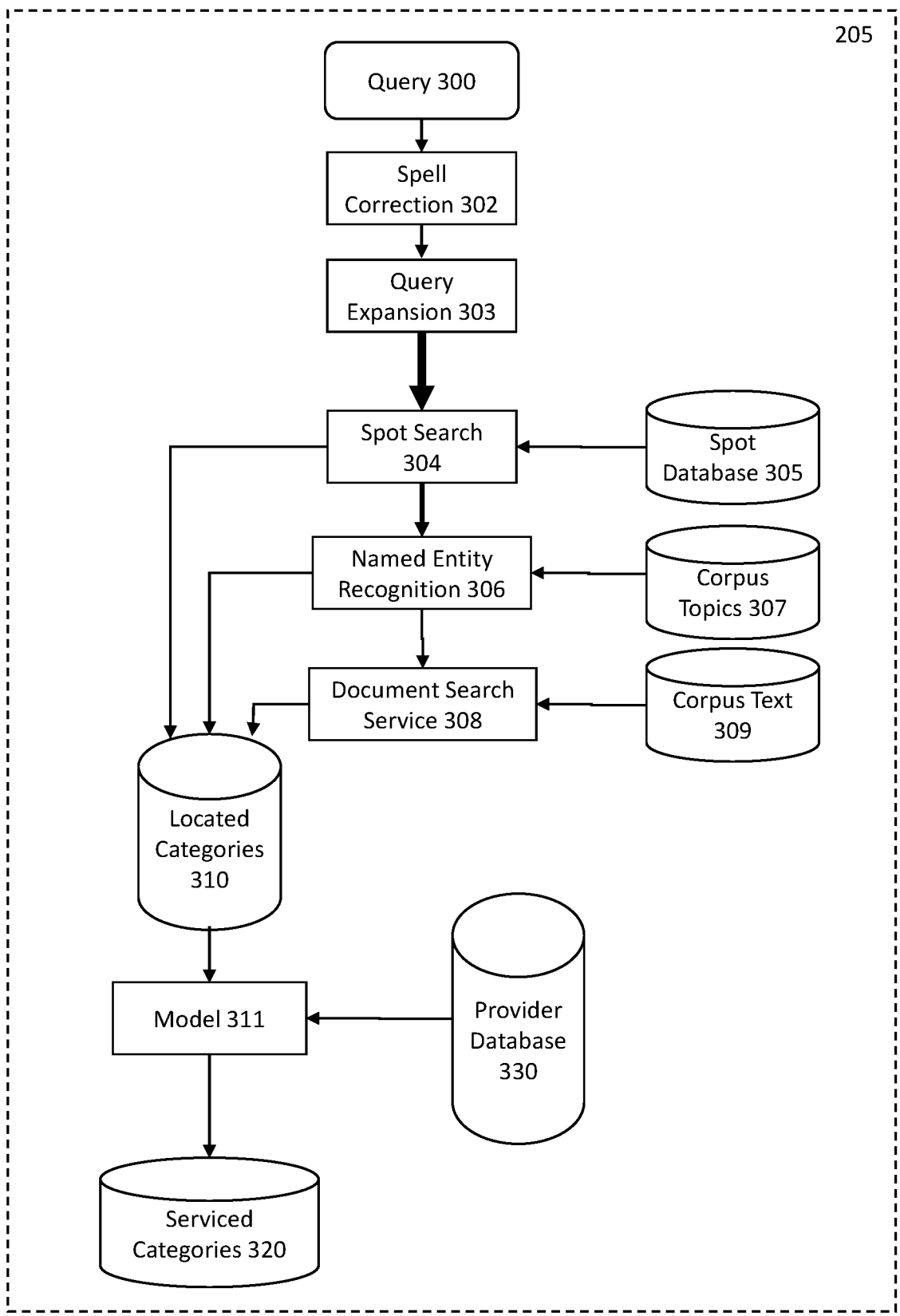
FIG. 3 shows the category matching process.

Match Categories step 205 is further described in FIG. 3. Query 300 received from request input step 202 is subjected to spell correction 302 using well-known techniques such as Levenshtein distance, Hamming distance, cosine distance, Jaro distance, q-gram, Jaccard distance, etc. Query terms that are declared incorrect may be replaced by corrected versions of these same terms.

Figure 8:
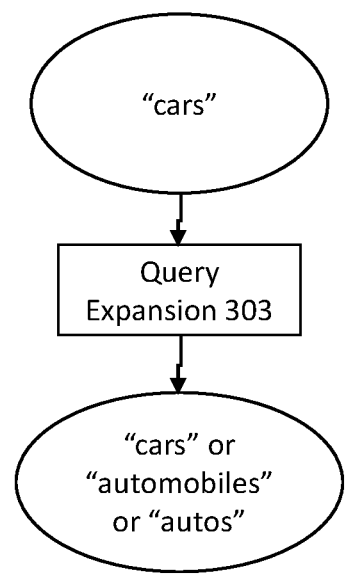
FIG. 8 shows the query expansion process.

During query expansion 303 the query is augmented by additional words that may include related words, root words, genus words, species words, etc. FIG. 8 shows an example of query expansion 303 wherein the original query for 'cars' is augmented by 'automobile' and 'auto' which are commonly used synonyms. While in many cases an augmented query may have only a single query term, this description will use the plural form in order to simplify the language and should be understood to include the case of a single query term.

Figure 9:
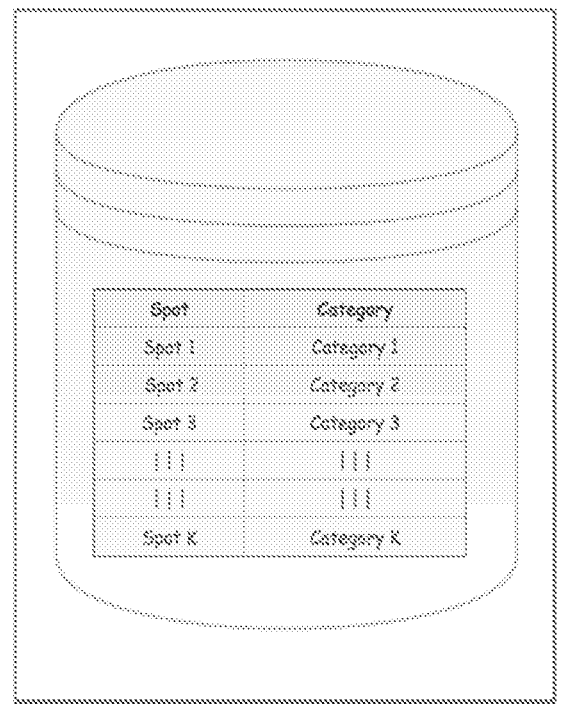
FIG. 9 shows the mapping table from spot to category.

Spots are stored in spot database 305. Each spot in spot database 305 provides a mapping from an entity to a category as shown in FIG. 9. The terms of the augmented query are looked up in spot database 305 by considering query terms as entities. Query terms that are found in spot database 305 provide categories for those terms and are added to located categories 310. Query terms that are not present in spot database 305 are subjected to named entity recognition 306. Named entity recognition provides categories for query terms by locating the query terms in the corpus topics database 307 and adding those into located categories 310. Query terms which are not recognized by named entity recognition 306 are subjected to document search service 308. Document search service 308 provides categories for query terms by performing full text searches on corpus text 309. Query terms located by document search service 308 have their corresponding category added to located categories 310.

An example entry in spot database 305 might indicate that the term "Nagekomi" (Japanese judo term for repeated throwing practice) is a spot for the category "Judo". Additional categories may be located through nearest neighbor techniques. For example, if "Nagekomi" (Japanese judo term for repeated throwing practice) is included as a spot for the category "Judo", the final user recommendation for the user may include "Judo" and neighbors like "Uke", "Ninjutsu" and "Jujutsu". These nearest neighbors can be found using natural language processing techniques that essentially maps each terminology in a corpus into a vector representation using algorithms like TFIDF (term frequency—inverse document frequencies, Doc2Vec, Word2Vec, Global Vectors (GloVe), etc.) and uses distance metrics like Hamming, Cosine or Manhattan distance to find the nearest neighbors (See FIG. 16).

Figure 10:
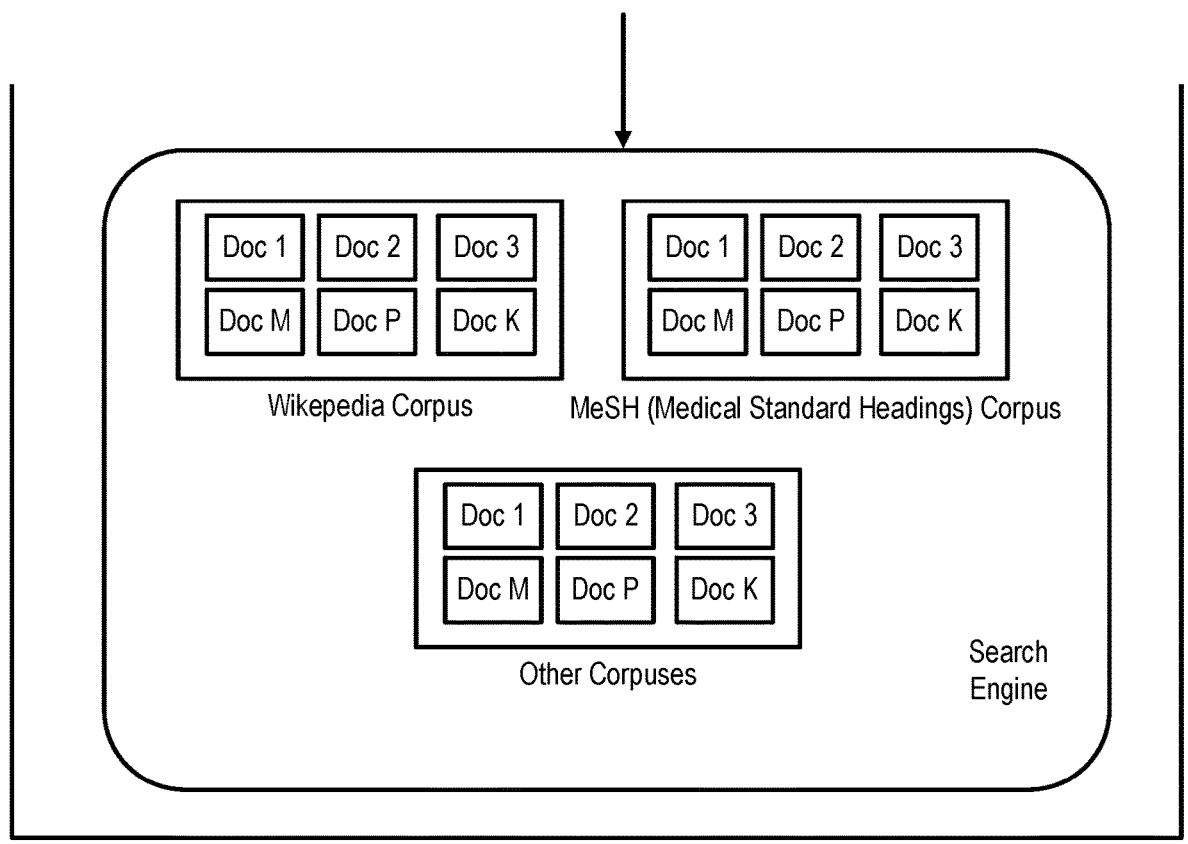
FIG. 10 shows the organization of the various corpuses used by the search engine.

Corpus text 309 is composed of multiple authoritative corpuses one of which may be Wikipedia corpus, another may be a MeSH (Medical Standard Headings) corpus, and another may be another type of corpus as illustrated in FIG. 10. Corpus topics database 307 may be constructed by processing of Corpus text 309. Some corpuses may already have a topics database which would simplify the construction of corpus topics database 307.

Located categories 310 and provider database 330 are processed by model 311 to form a set of serviced categories 320 which is the subset of categories present in provider database 330 that are considered to be good matches for located categories 310. Model 311 may include one or more elements of machine learning, deep learning, natural language processing (NLP), autonomous databases, Bayesian statistics, recommendation systems, search relevance (e.g., modeling and/or vectorization), time-series forecasting, etc. alone or in combination.

The entries in spot database 305 are generated by processing of content from sources other than corpus text 309. Sources of content include: a social media posting of the consumer or service provider, a website of the consumer or service provider, a publication of the consumer or service provider, the consumer's or service provider's pictures on a social media site or client device, etc. Processing is done using one or more elements of machine learning, deep learning, natural language processing (NLP), autonomous databases, Bayesian statistics, recommendation systems, search relevance (e.g., modeling and/or vectorization), time-series forecasting, etc. alone or in combination.

Render Categories (201)

Figure 4:
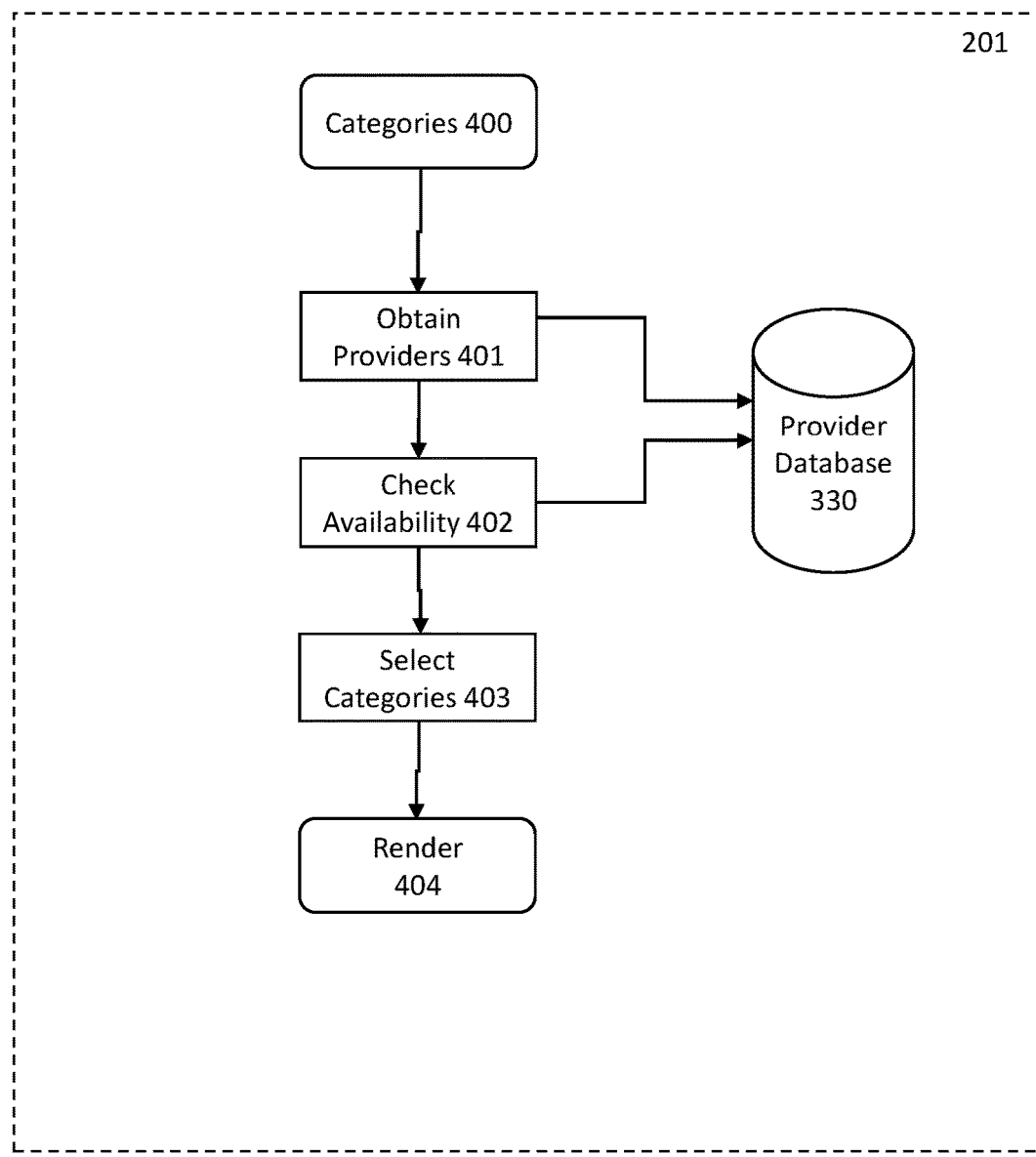
FIG. 4 shows the process to render categories on the client device.

Render Categories step 201 is further described in FIG. 4. Each category of categories 400 is used to access provider database 330 to obtain the list of service providers for that category. In check availability step 402 each provider is determined to be currently available or not. Service provider availability information may be stored in provider database 330.

Select categories step 403 makes the final determination of which categories will be displayed and in what order. Many criteria can be considered for this final determination including: quantity of providers for a category, number of currently available providers for a category, quality of match of a category to the original query, subscription level of a provider, skill rating of a provider, location of a provider, language of a provider, etc.

Render 404 takes categories selected and prioritized by select categories 403 and generates a selection display upon consumer computer system 101. In a preferred embodiment, if categories 400 comes from match queries 205 then the display may also show the original query terms and/or the augmented query terms. In a preferred embodiment, each displayed category is decorated so as to indicate whether a provider is currently available in that category. In some embodiments additional information could be displayed for each category, for example: actual number of available providers, identification information for providers, etc. The selection display may itself be divided into groups of categories to indicate additional information like: group availability, quality of category match to a query term, etc.

Figure 7:
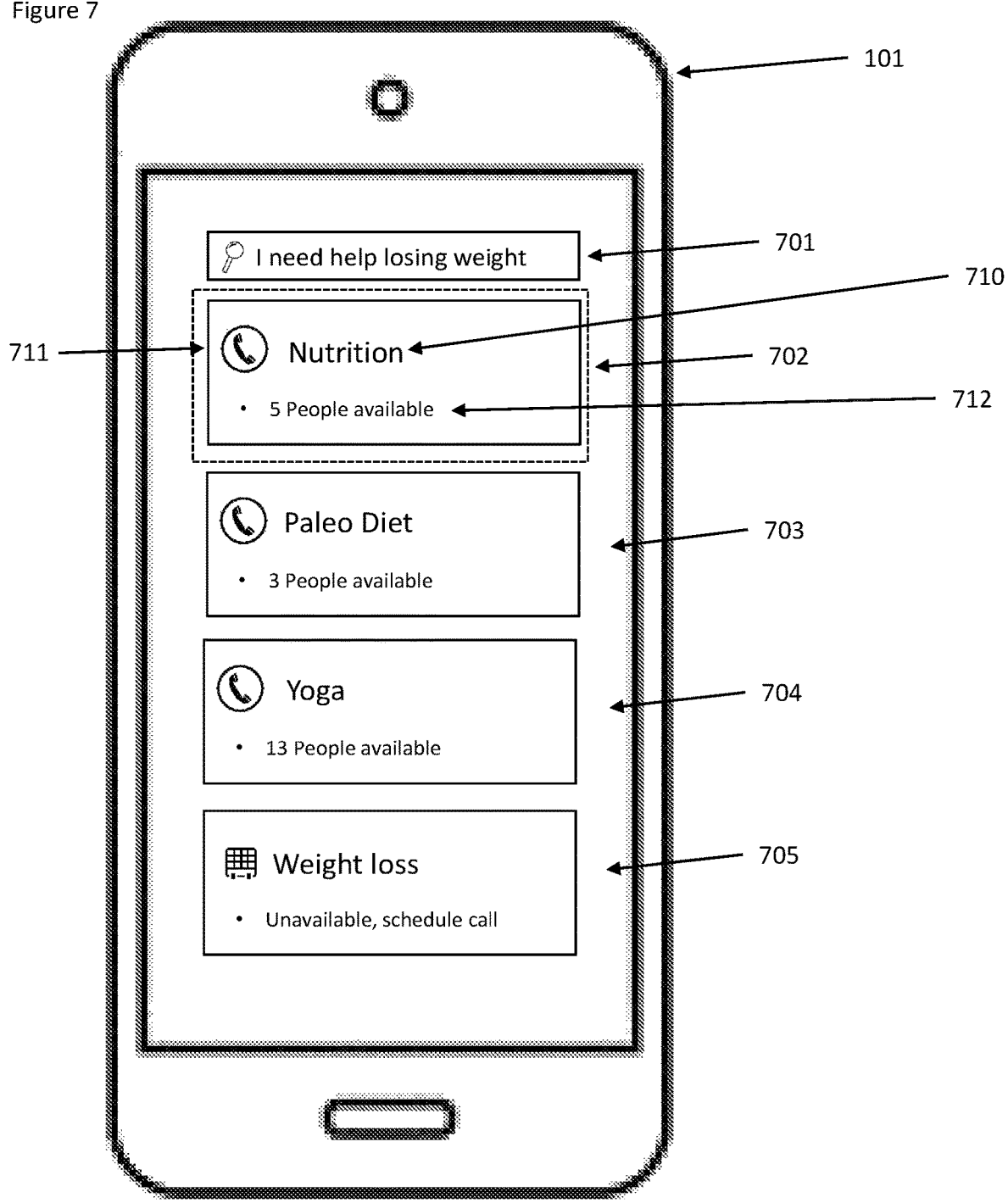
FIG. 7 shows an example of a category selection screen after processing a query.

FIG. 7 shows an example output of render 404. Element 701 is a well-known search bar which in this example repeats the original query "I need help losing weight". Visual element 702 corresponds to a category. Element 710 is the text of the name for the category. Element 711 is an icon indicating whether one or more providers are currently available. Element 712 provides additional descriptive text (in this example, the actual number of available providers is available). Elements 703 and 704 are similar to Element 702 except that the category name and additional descriptive text are different. Element 705 provides an example of a recognized category for which no providers are currently available. The calendar icon and descriptive text inform the user while no provider is currently available a calendaring mode of the program could be invoked to schedule a future call. In a preferred embodiment the text of the above elements is rendered in the language of consumer 105.

Select Provider (601)

Figure 5:
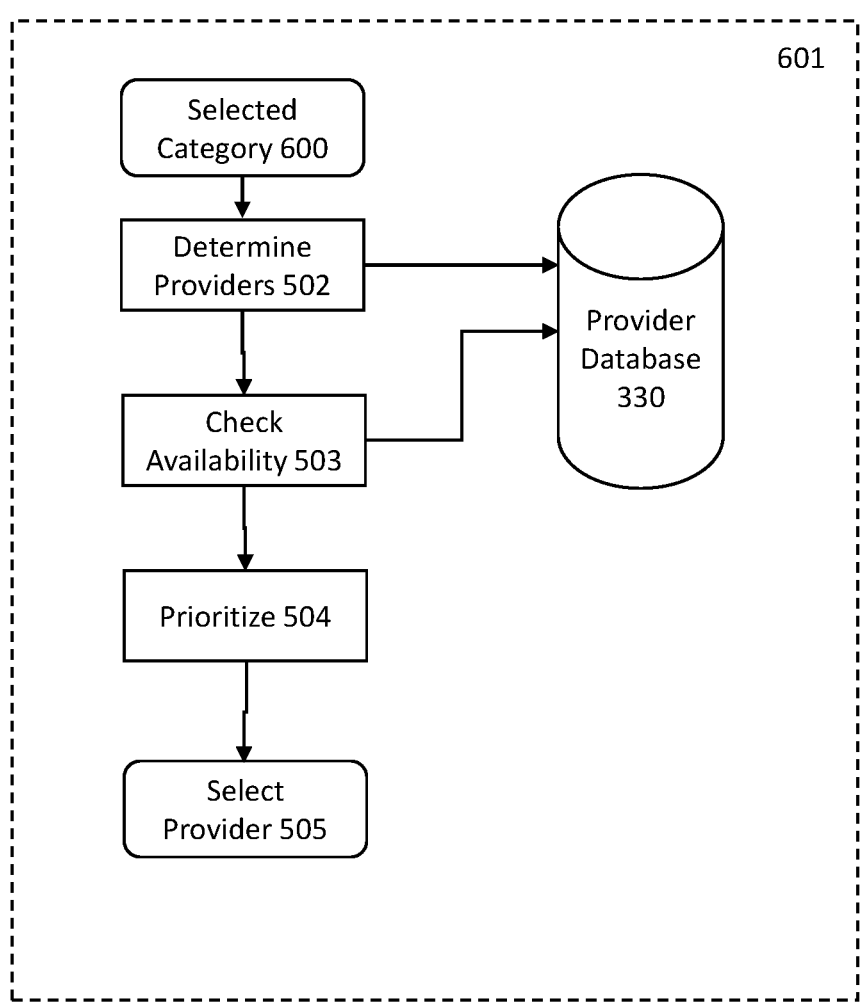
FIG. 5 shows how service providers are selected for a particular category.

FIG. 5 shows the process of selecting an individual provider. Determine providers step 502 looks up selected category 600 in provider database 330 to obtain a list of providers that service selected category 501. Check availability step 503 determines the current availability of each provider using information from provider database 330 and potentially other information (see below on determining provider availability).

Prioritize step 504 ranks the providers. Many criteria can be used alone or in combination, e.g., provider subscription level, consumer subscription level, quality of provider, whether this consumer has previously been connected to this provider, query terms, timely responsiveness (e.g., connecting to bi-directional audio/video feeds), provider skills with respect to the query terms and/or selected category, etc. Provider quality and/or skills may be determined according to an analysis of their social media, resumes, published articles, etc.

Call Processing (204)

Figure 6:
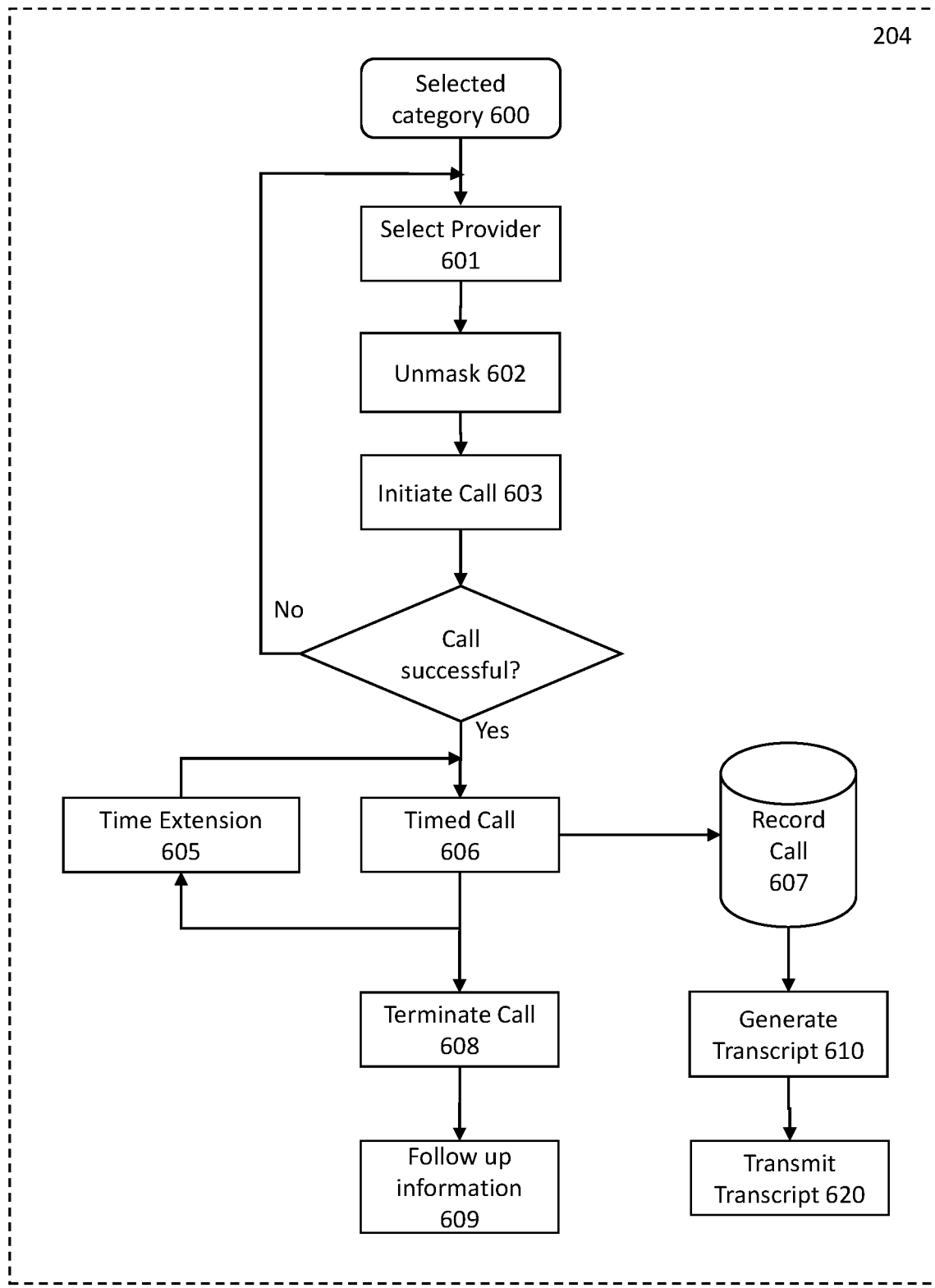
FIG. 6 shows the processing of a call.

Call processing 204 is further described in FIG. 6. Selected category 600 is obtained from request input 202 and is routed to select provider 601 to select a specific (see above for details). Unmask step 602 transfer consumer identification information such as name, handle, IP address, etc. to on service provider computer system 102. Conversely service provider identification information such as name, handle, IP address, qualifications, ratings, etc. are transferred to consumer computer system 101. Optionally consumer computer system 101 displays some or all of the service provider identification information on consumer computer system 101. Similarly some or all of the consumer identification information is displayed on service provider computer system 102.

Initiate call step 603 initiates a bi-directional audio/video feed (call) between consumer computer system 101 and service provider computer system 102. In a preferred embodiment, the call may either be performed directly between the two computer systems or maybe done indirectly by using server computer system 103 as a proxy or relay agent. It should be noted that during the initiation of the call before it is connected both the consumer 105 and service provider 106 independently have the ability to cancel the call possibly based on the identification information displayed by unmask step 602. Additionally, the system times the duration of the call initiation (i.e., before the provider answers the call) and will automatically cancel the call if not answered in a pre-determined time, e.g., 30 seconds, one minute, etc.

If the call fails either due to cancellation by service provider 106 or the expiration of the pre-determined time or for any other reason (potentially network failure, etc.) then the system returns to select provider 601 to attempt to call again. In a preferred embodiment, the system may alter the prioritize step 504 so as to avoid selecting the same provider as on the previous iteration.

Once the call is successfully initiated (i.e., the service provider answers the call) the system enters step timed call 606 wherein the system times the duration of the call. In a preferred embodiment, calls are limited to a pre-determined duration (e.g., five minutes, seven minutes, etc.) which can be extended by consumer 105 or by service provider 106 via step time extension 605 which typically requires the transfer of some amount of money for some additional pre-determined amount of time. Timed call 606 may provide a video and/or audio indication of the impending termination of the call in order to allow sufficient time for consumer 105 or service provider 106 to exercise time extension 605 before the call is terminated. If time extension 605 is not entered, then upon expiration of the pre-determined amount of the time system terminates the call.

Regardless of how the call terminates (i.e., time expiration or manual disconnection by either consumer 105 or service provider 106) terminate call step 608 is entered which performs logging and other housekeeping functions. In a preferred embodiment, the linking of consumer 105 and service provider 106 is recorded so that the system is able to adjust the priority of this service provider so that the client will be more likely to connect to other service providers in future calls.

Follow up information 609 allows the collection and possible transmission of information after the call has terminated. In a preferred embodiment, consumer 105 may be prompted to provide feedback. Feedback may include information for transmittal to service provider 106, e.g., text messages, World Wide Web links (URLs), voice messages, pictures, etc. For example, a consumer may wish to transmit a text message reminding the service provider of something that was discussed (e.g., "Please don't forget to send me that article you talked about."). Other feedback may be also be collected, e.g., provider ratings, call quality ratings, overall experience ratings, category matching quality ratings, etc. Some of this other feedback may be used by the system to adjust internal provider prioritization (i.e., prioritize 504) and could be stored in provider database 330. Some of this other feedback could be used to adjust and improve the algorithms of match categories 205 (i.e., named entity recognition 306, model 311, etc.). Similarly service provider 106 may also provide feedback, some of which could be transmitted to consumer 105 (text messages, files, World Wide Web links (URLs), pictures, voice messages, pictures, etc.) and others of which can adjust and improve internal algorithms, e.g., prioritize 504, named entity recognition 306, model 311, etc.

Optionally, record call 607 will record the bi-direction audio/video feed, which is then transcribed by generate transcript 610 and sent to consumer 105 and/or service provider 106 via transmit transcript 620. Generate transcript 610 may also process the video using well known machine learning techniques to further augment the transcription.

Discover Categories (210)

Before consumer 105 has entered a search query or if the search query is empty or null the system creates a set of categories designated discover categories 210. In some embodiments this may simply be a fixed list of categories, possibly obtained from service computer system 103. In an alternate embodiment, discover categories 210 could be generated dynamically by considering information such as the identity of consumer 105, previous interactions of the system with consumer 105 (e g, previous search query terms), geographic considerations, availability of service providers, time of day, language of consumer 105, a social media posting of the consumer, a website of the consumer, a publication of the consumer, the consumer's pictures on a social media site or client device, etc.

Status Changed

The system is monitoring the information that is used either directly or indirectly by match categories 205 and render categories 201 (as described above). Some or all of this information may change due to various events such as initiation or termination of a call, enrollment of a service provider, acquisition of a new category by an existing service provider, changes in corpus topics 307 and/or corpus text 309, changes in spot database 305, changes in service provider availability, etc. The request input step 202 recognizes when the currently displayed information may no longer be correct (e.g., number of available providers is affected by call initiations and terminations, etc.) and exits step 202 looping back to step 201 to generate a new display which is derived from the updated information.

Service Provider Availability

The availability of a service provider is derived from multiple pieces on information in the system. A service provider may construct and maintain a calendar of availability which is stored in provider database 330 (e.g., Tuesdays from 1-5 pm). A service provider may provide temporary exceptions to the calendar by using service provider computer system 102 (i.e., manually indicating availability or unavailability). The system is also aware of when a service provider is currently participating in a call and can thus automatically determine that the service provider is unavailable. The dynamic behavior of a service provider can also be used by the system, for example, if a service provider has recently failed to answer one or more calls within the pre-determined amount of time, then the service provider could be considered as unavailable possibly for some duration or until the service provider explicitly notifies the system of re-availability.

Onboarding

Figure 12:
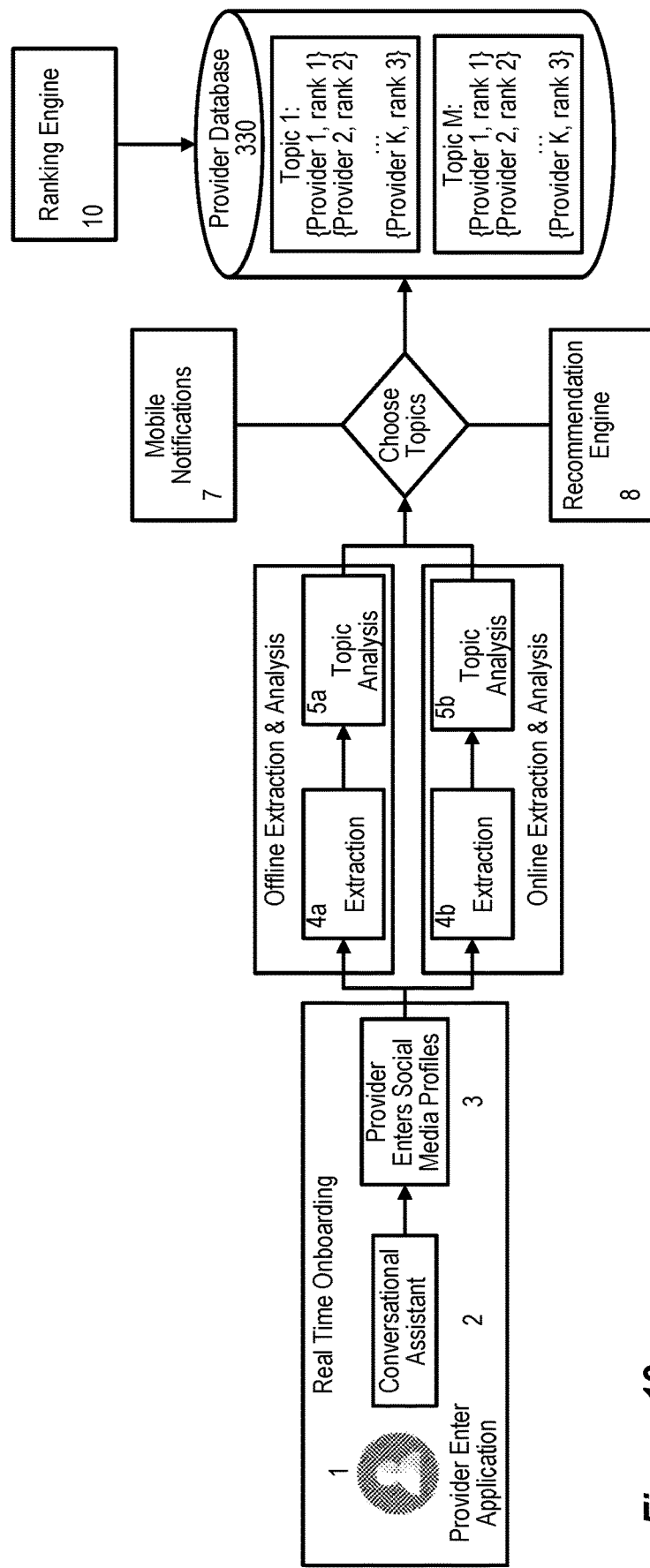
FIG. 12 is a block diagram of the lifecycle of the processes involved in onboarding a human expert with an evolving set of topics of expertise in an online marketplace setting.

Referring to FIG. 12, the inventors propose a process by which a provider can be on-boarded in an expert marketplace. When the provider enters application 1 through launching a mobile application, using a voice assistant such as Siri, Google Assistant or through a desktop website, conversational assistant 2 greets the provider to link his social media profiles by entering his credentials for each platform. The contents are then extracted through the combination of online and offline content analysis as shown in blocks 4a, 4b, 5a and 5b, see below. The output from the content analyzers is a set of topics weighted by the scores that represent the density of the topics. The top topics are then presented to the provider wherein he chooses the topic he wants to be on-boarded. The topics of expertise can also be on-boarded incrementally through mobile notifications, SMS messages, web or other media like voice, voice-to-text 7. Once a set of topics is chosen, a ranking algorithm 10 may then be triggered to rank the provider based on the relevance of the content of his social media in regards to those topics. Provider database 330 is used to store the topics and rankings for this provider (and may be a convenient place to store additional provider associated information such as credentials, references to provider content, scoring of individual pieces of provider content, etc.)

The conversational assistant can be anything such as a chatbot, or a voice assistant like Amazon Alexa or Google Assistant. In case of desktop based application, a provider can be presented with a list of dialogues that prompts them to connect their social media profiles. Conversational assistants 2 such as chatbots may automate personalized messages and may reach a broad audience on messenger applications. In this manner, efficiency may be improved by taking over tasks where a human may be unproductive, for example recruiting of providers in masses.

Recommendation engine 8 finds topics of expertise that are similar to previously identified topics of expertise for a provider. Some or all of these may then be presented to the provider to be added to their list of expertise. For example if a provider is choosing a topic Bodybuilding, the recommendation engine recommends other nearby topics of expertise such as Calisthenics, Weight management, Weight training, etc. Additional criteria beyond similarity could be included, e.g., frequency of consumer request, provider availability, etc.

Recommendations (i.e., topics of expertise selected by recommendation engine 8 for a provider) can be generated at any time by the system. Typical events that are used to invoke recommendation engine 8 include: an addition to the list of topics of expertise for a service provider (i.e., during onboarding or as a result of another recommendation being accepted), a new spot in the spot database, changes in corpus text 309 or corpus topics 307, etc.

Figure 13:
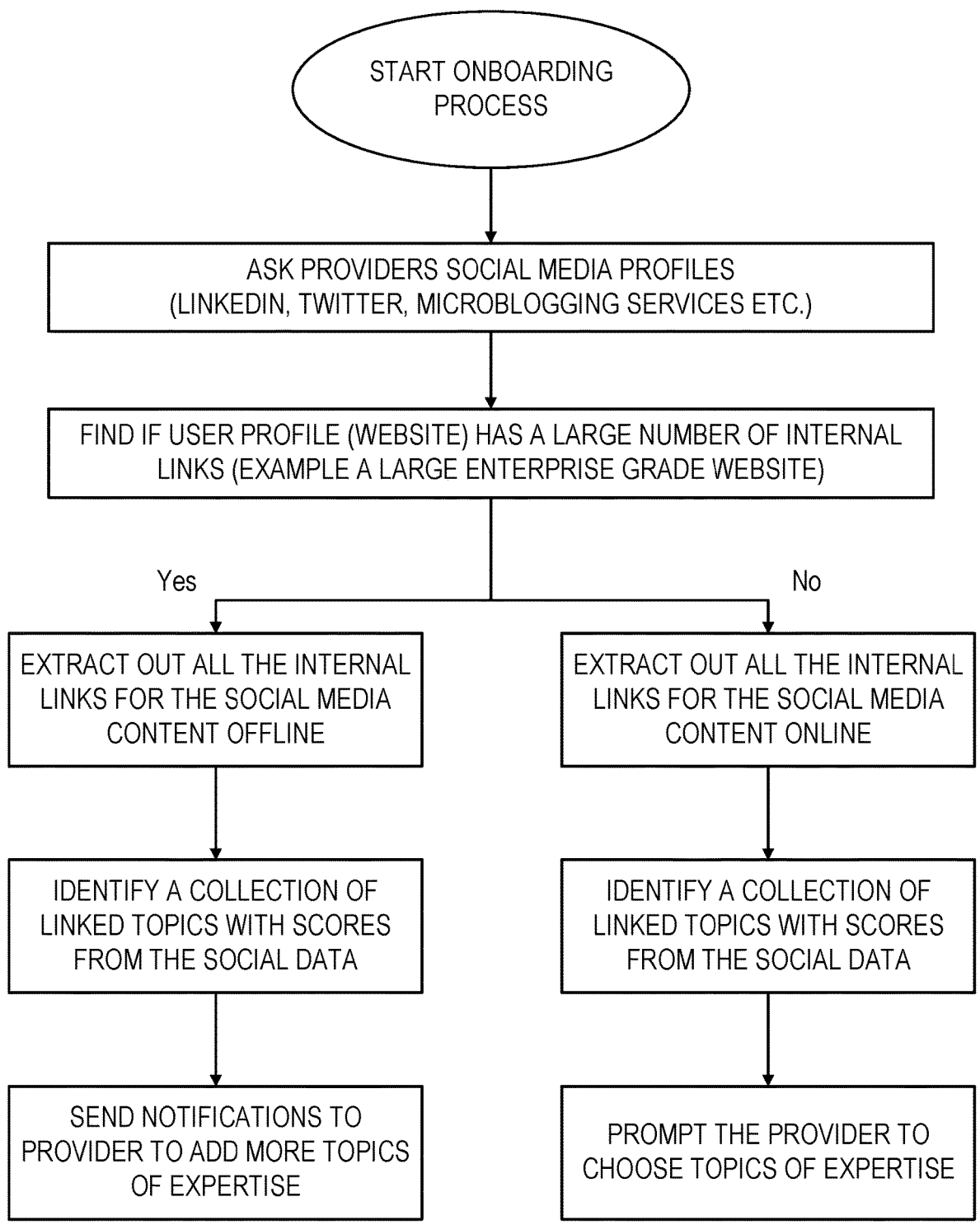
FIG. 13 is the flowchart describing both the online and offline computing required to process provider's social media data.

FIG. 13 explains the process of the offline and online extraction and processing. The process takes the provider's content and outputs topics as recommendations to add to their profiles. A provider is asked to enter his additional content which is typically in form of references to other online content, e.g. social media profiles (e.g., credentials for LinkedIn, Twitter, Facebook, etc.), publications, papers, presentations, URLs, etc. In some embodiments, it may be more advantageous to extract the content while online. The online process must occur quickly (e.g., almost immediately). If the amount of content is too great to provide suitably fast responses, the parser may limit its processing (e.g. by size or by a select timeline) to give valid expertise topic recommendations in real time. The offline extractor will later process the content (in whole or substantially just the deferred portions) to complete the extraction. The offline extractor may find additional recommendations which are then communicated to the provider.

For example, if an experienced provider has years and years of social media content in the form of blog posts, tweets, etc., or if there are many internal links within a provider's profile (e.g. a website with a massive amount of content on various pages), the platform could start an offline extraction process by scraping out the contents of the site with older creation dates and analyzing the sites for topics of expertise. Once the contents are analyzed, the platform may then then use mobile notification channels like email or text to onboard the providers to an incremental set of categories at various intervals.

In a preferred embodiment, the system automatically runs the offline extractor when new content becomes available. Some content sites provide a mechanism to be automatically notified of changes in contained content, typically those sites require some kind of registration to enable and direct the generation, transmission and receipt of those automatic notifications (e.g. REST call, API call, e-mail message, SMS, etc.). For sites that do not provide automatic notification, the system can periodically poll to determine if updated content is available.

In a preferred embodiment the extractor process yields a list of proposed topics of expertise for a provider that is presented to the service provider for final approval. The reason for the approval process is to remove topics resulting from content that may not belong to their area of expertise. For example a provider who is also soccer enthusiast might post about soccer matches on his social tweets. However, that doesn't automatically make him an expert in soccer. These potential outliers resulting from irrelevant social media posts, if added automatically, may skew a provider's profile. By presenting a list, the provider is now able to choose his areas of expertise and remove any sources of noises like the example above. Topics that are recommended by the offline extraction process can use push notifications to notify the provider that further recommendations are available for review.

It may be helpful to continuously update provider's expertise with newer topics as and when they update their social media pages. Additionally or alternatively, it may be helpful to have continuous (e.g. near continuous such as daily or weekly) addition of new topics of expertise so as to keep current with the latest state of the world. For example, a new tax law may be introduced and a user may want to learn more about it from a provider. At the same time, we cannot expect all of the tax professionals to know every detail about that new tax law without some research or training. By accommodating providers with that expertise on that tax law, a pool of professionals who know about that tax law can be maintained. By reprocessing the multiple online corpuses (e.g. Wikipedia, Medical Subject Headings/MeSH, Dbpedia, Freebase, etc) the platform can now keep adding new topics as well as new information related to existing topics.

Figure 11:
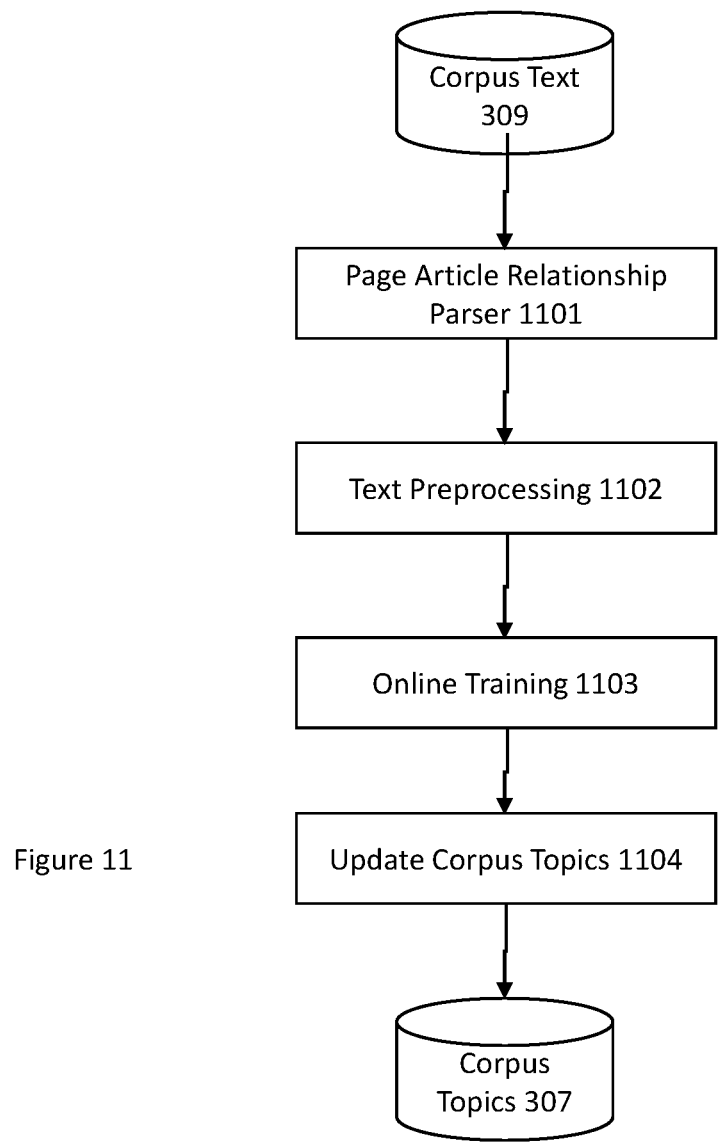
FIG. 11 shows the steps for processing of the corpus.

FIG. 11 explains the case of extracting out topics from corpus servers that are constantly updated as and when new entries are added. Corpus text 309 is passed through the article relationship parser 1101 which may parse the articles and the contents within the articles. The parsed articles are then processed by text preprocessing 1102. Text preprocessing 1102 uses some of the popular NLP techniques which may include stop-word removal, lemmatization, POS tagging, entity recognition, etc. The preprocessed text is used to train an online model 1103. The online model may use any popular NLP or deep learning models such as doc2vec, etc. The resulting topics and vectors are stored in the corpus topics database 307. The pages by themselves may then constitute the skills or the topics of expertise that a provider can choose to consult for with the platform.

Figure 14:
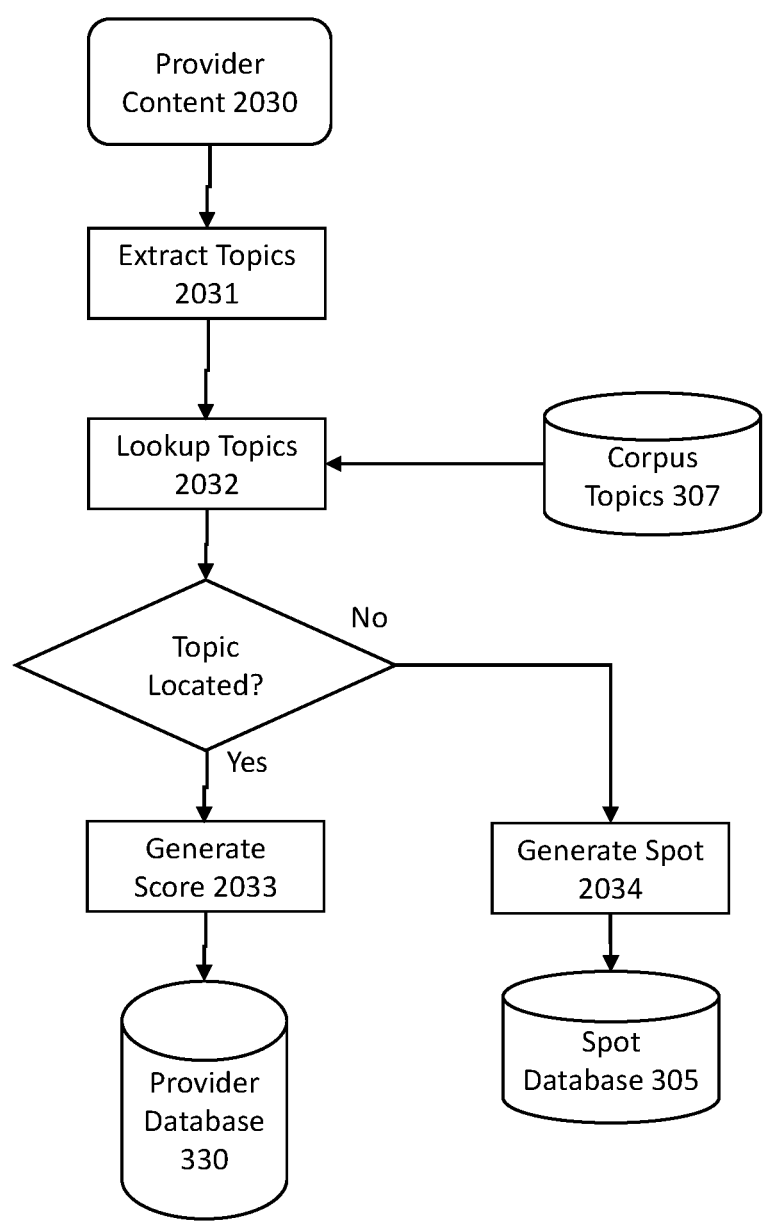
FIG. 14 shows the processing of provider content.

FIG. 14 shows the processing of provider content. Provider content 2030 is processed by extract topics 2031 to identify and extract the topics of the content. Extract topics 2031 uses algorithms similar to article relationship parser 1101, text preprocessing 1102 and online model 1103 to extract the topics from provider content 2030. Lookup topics 2032 searches corpus topics 307 for each of the extracted topics. If the extracted topic is not located within corpus topics 307 then generate spot 2034 adds the extracted topic to spot database 305. If the extracted topic is located then generate score 2033 updates the scoring for this content.

The inventors also propose various methods for educating providers using recommendations. With the combination of topics modelling algorithms like LSI (latent semantic indexing), LDA (latent dirichlet analysis), Explicit Semantic Analysis, and Hierarchical Dirichlet Process and word embeddings such as Word2Vec, LDA2vec, Glove, etc., content regarding complimentary topics can be recommended to providers for educational purposes. For example, an expert on Calisthenics could be shown content regarding Plyometrics or Circuit training in order to round out their skill sets. The models for the recommendation engine will be updated as and when newer articles appear in the corpus, allowing for the articles to be available to the providers.

Figure 15:
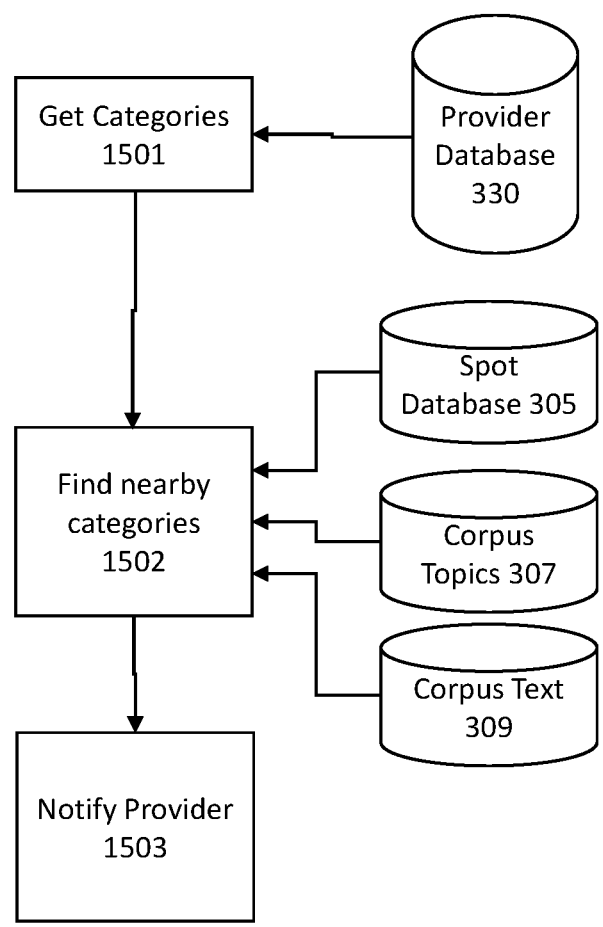
FIG. 15 is the flowchart describing the recommendation system that can be put in place for providers to recommend nearest topics of their expertise to broaden their skills.

FIG. 15 describes a process in the context of this specification that identifies topics to recommend to service providers. In get categories 1501 the provider database 330 is consulted to determine which categories a provider is currently servicing. In step 1502 corpus text 309, corpus topics 307 and/or spot database 305 are consulted to identify categories which are nearby the currently serviced set of categories for a provider but not currently identified as categories serviced by this provider. These categories form the recommendations that are then sent to the service provider.

Figure 16:
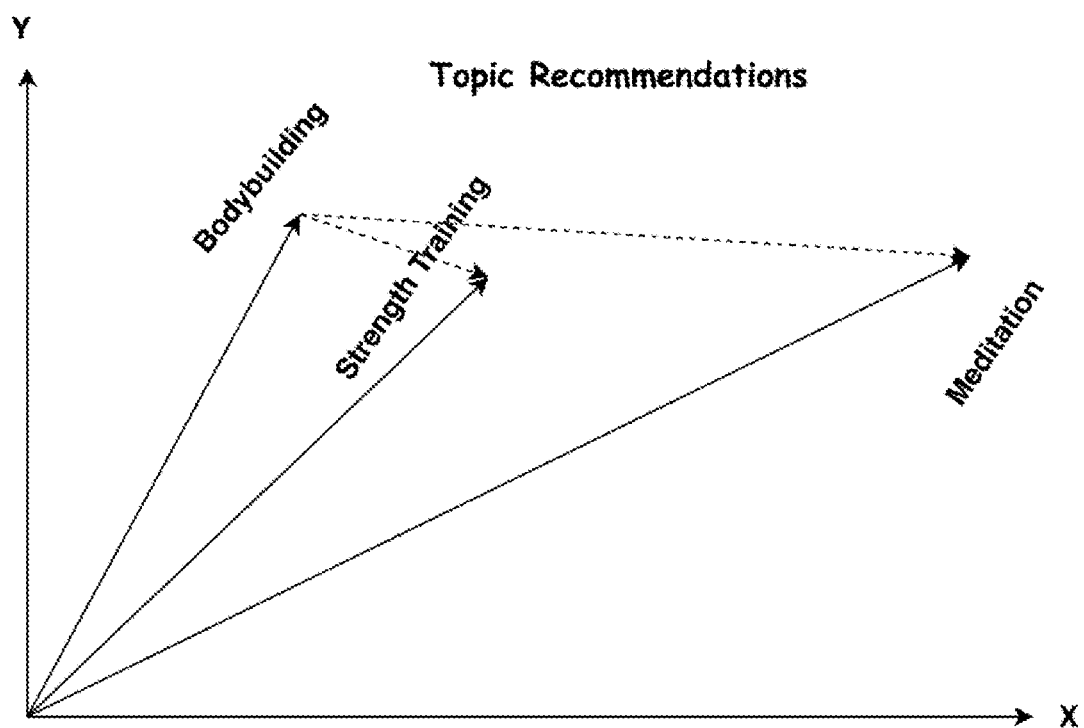
FIG. 16 is a 2-dimensional view of the topics in vector space separated by a distance that is relative to the relatedness of topics.
Figure 19:
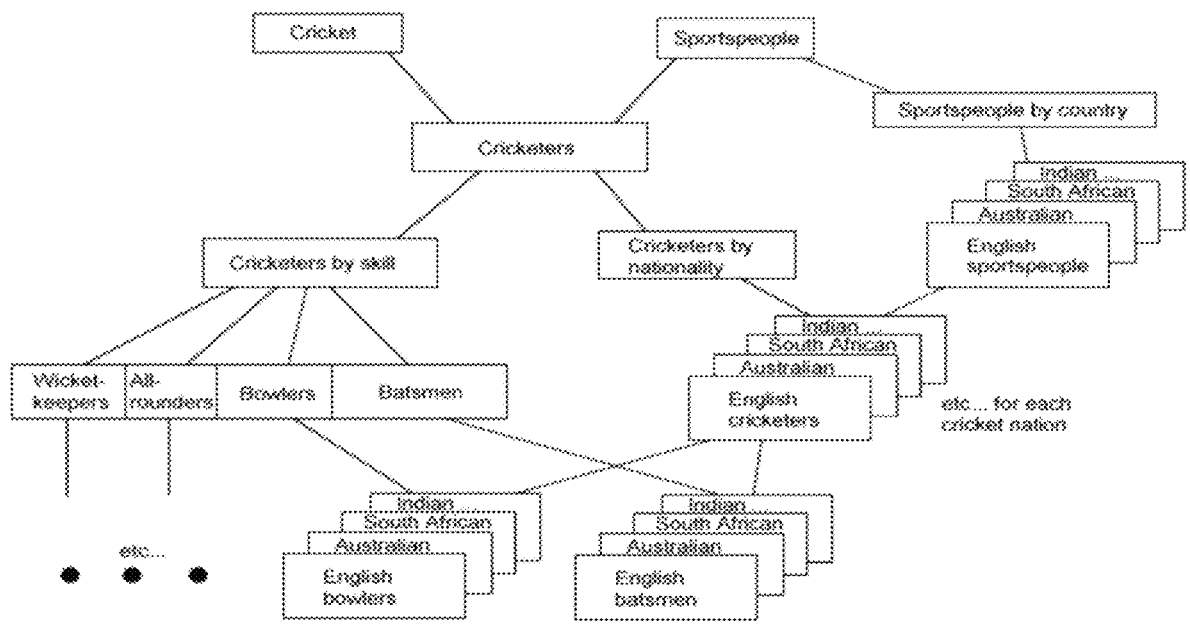
FIG. 19 shows an example of a category tree hierarchy of Wikipedia pages for a specific topic.
Figure 20:
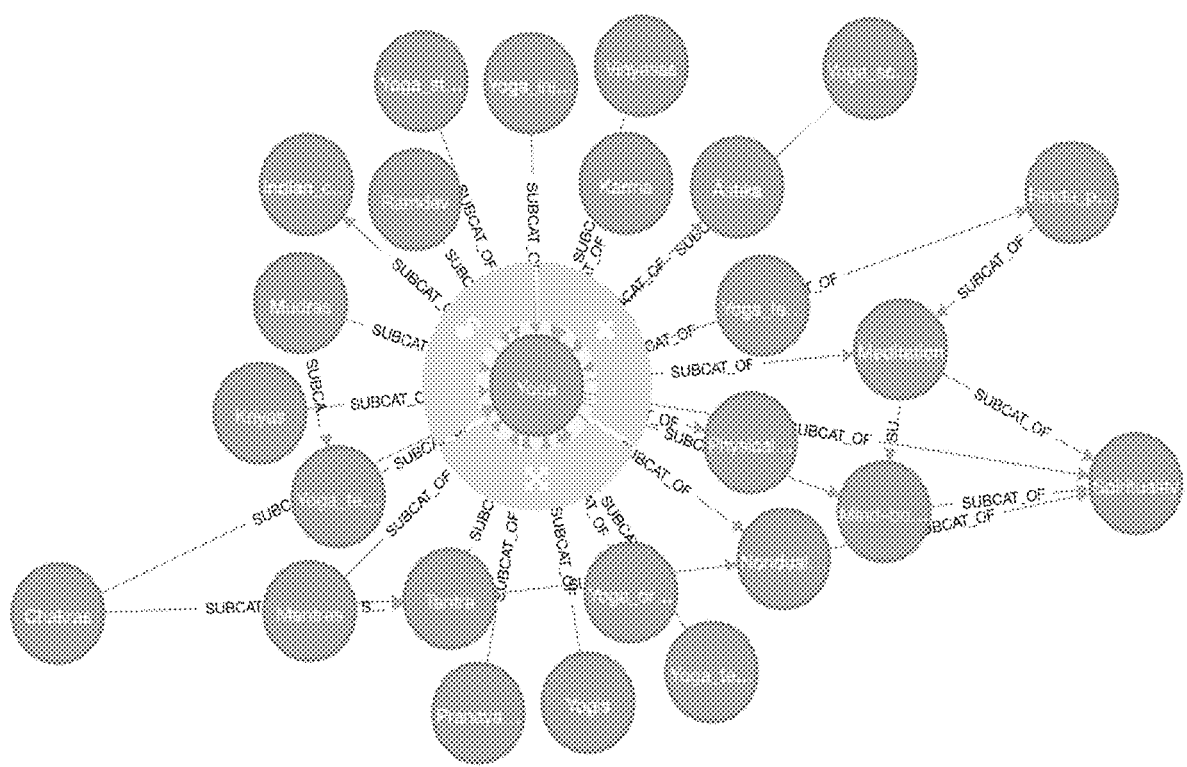
FIG. 20 shows an example Wikipedia category structure to the page "Yoga".

FIG. 16 shows an example where vector representations of the topics of expertise are projected into a 2-Dimensional space for illustration purposes. Algorithmic techniques like Word2Vec and Glove may help us build these vector representations of the topic of expertise based on the contents and their absolute distance metrics that could be used to determine nearest neighbors. In a preferred embodiment, nearest neighbor determination is used for purposes including: topic recommendations, consumer search query, or whenever it is desirable to compare two topics or categories to determine if they are semantically adjacent.

Additionally or alternatively, the present disclosure includes a way in which these experts can be ranked on the platform. We may take several points of indicators from providers' social media presence like clout scores, number of followers, number of retweets in case of providers twitter account, number of likes etc. to evaluate providers' expertise through ranking algorithms like Bayesian personalized ranking, etc. These indicators not only allow us to rank the providers in the marketplace, but may also provide us with a way to route the calls for expert help on a particular topic based on a ranking system.

Modifications, additions, or omissions may be made to the environment and/or any portion of the disclosure (such as the example embodiments outlined above and any corresponding figures) without departing from the scope of the present disclosure. For example, it is understood that, for this and other processes, operations, and methods disclosed in this disclosure, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

As indicated above, the embodiments described in this disclosure may include the use of a special purpose or general purpose computer (e.g., the processor 110 of FIG. 1) including various computer hardware or software modules, as discussed in greater detail below. Further, as indicated above, embodiments described in this disclosure may be implemented using computer-readable media (e.g., the memory 112 of FIG. 1) for carrying or having computer-executable instructions or data structures stored thereon.

In some embodiments, the different components, modules, engines, and services described in this disclosure may be implemented as objects or processes that execute on a computing system. While some of the systems and methods described in this disclosure are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in this disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used in this disclosure to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in this disclosure are intended for pedagogical objects to aid the reader in understanding the invention and the concept contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A method for analyzing skills of a service provider, the method comprising:
    receiving a corpus text comprising a plurality of articles;
    parsing the plurality of articles using text pre-processing, the text pre-processing comprising at least one of a stop-word removal processing, a lemmatization processing, or an entity recognition processing;
    training an online model using the parsed plurality of articles, the online model being trained using at least one of a deep learning training or a doc2vec training and the online model comprising at least one of a deep learning element, an autonomous database element, a Bayesian statistics element, a recommendation system element, or a search relevance element;
    automatically detecting a change to the plurality of articles in the corpus text has occurred;
    automatically parsing the changed plurality of articles using the text pre-processing;
    automatically training the online model using the parsed changed plurality of articles;
    automatically accessing content of the service provider;
    extracting a topic from the content using the online model;
    mapping the topic to a category of a corpus or a spot database as a vector representative of the topic;
    storing the mapped topic as the vector representative of the topic in a topics database;
    selecting the mapped topic from the topics database;
    presenting the selected topic to the service provider via a display;
    receiving user input provided by the service provider, the user input indicating approval of the selected topic;
    updating a skill rating of the service provider in a provider database for the category corresponding to the selected topic based on the approval indicated in the user input;
    determining topics that the service provider currently services based on the vector representative of the topic;
    identifying a topic that is related to the topics that the service provider currently services based on the vector representative of the topic and a vector representative of the topic that is related to the topics that the service provider currently services; and
    presenting the topic that is related to the topics that the service provider currently services to the service provider via the display.

2. The method of claim 1 further comprising:
    extracting a second topic from the content using the online model, wherein the second topic cannot be mapped to the category of the corpus or the spot database; and
    augmenting the spot database for the second topic.

3. The method of claim 2 further comprising:
    connecting a consumer to the service provider based on the updated skill rating.

4. The method of claim 3 wherein the content comprises social media.

5. The method of claim 4 wherein the accessing further includes:
    waiting for a predetermined time.

6. The method of claim 4 wherein the accessing further includes:
    receiving an input indicating a change in available social media.

7. The method of claim 3 wherein the content comprises a call transcript.

8. A method to find topics of expertise to recommend to a first service provider, the method comprising:
- receiving a corpus text comprising a plurality of articles;
- parsing the plurality of articles using text pre-processing, the text pre-processing comprising at least one of a stop-word removal processing, a lemmatization processing, or an entity recognition process;
- training an online model using the parsed plurality of articles, the online model being trained using at least one of a deep learning training or a doc2vec training and the online model comprising at least one of a deep learning element, an autonomous database element, a Bayesian statistics element, a recommendation system element, or a search relevance element;
- automatically detecting a change to the plurality of articles in the corpus text has occurred;
- automatically parsing the changed plurality of articles using the text pre-processing;
- automatically training the online model using the parsed changed plurality of articles;
- accessing content of the first service provider;
- extracting one or more topics of expertise from the content using the online model;
- finding a topic in a corpus or a spot database similar to but not present in the topic of expertise of the first service provider;
- storing the found topic as a vector representative of the found topic in a topics database;
- selecting the found topic from the topics database;
- notifying the first service provider of the found topic via a display;
- receiving user input provided by the first service provider, the user input indicating approval of the found topic;
- updating a list of expertise of the first service provider in a provider database to include the found topic based on the approval indicated in the user input;
- determining topics that the service provider currently services based on the vector representative of the found topic;
- identifying a topic that is related to the topics that the service provider currently services based on the vector representative of the found topic and a vector representative of the topic that is related to the topics that the service provider currently services; and
- presenting the topic that is related to the topics that the service provider currently services to the service provider via the display.

9. The method of claim 8 further comprising:
- adding a topic to the one or more topics of expertise of the first service provider in the content.

10. The method of claim 8 further comprising:
- adding a topic to the corpus or spot database.

11. The method of claim 10 wherein the added topic is a result of processing content from a second service provider.

12. The method of claim 11 wherein the content is derived from a transcript.

13. The method of claim 11 wherein the content is derived from a social media posting.

14. A method to onboard a first service provider in an expert marketplace, the method comprising:
- receiving a corpus text comprising a plurality of articles;
- parsing the plurality of articles using text pre-processing, the text pre-processing comprising at least one of a stop-word removal processing, a lemmatization processing, or an entity recognition process;
- training an online model using the parsed plurality of articles, the online model being trained using at least one of a deep learning training or a doc2vec training and the online model comprising at least one of a deep learning element, an autonomous database element, a Bayesian statistics element, a recommendation system element, or a search relevance element;
- automatically detecting a change to the plurality of articles in the corpus text has occurred;
- automatically parsing the changed plurality of articles using the text pre-processing;
- automatically training the online model using the parsed changed plurality of articles;
- receiving one or more characters of text from the first service provider;
- extracting a topic from the one or more characters of text using the online model;
- generating a category by matching a vector representative of the topic to a corpus or a spot database;
- augmenting the category by searching the corpus or the spot database for a similar category;
- displaying the category and the similar category; wherein the corpus or the spot database contains categories created by processing content of a second service provider;
- receiving user input provided by the first service provider, the user input indicating approval at least of the category and the similar category;
- updating a list of categories associated with the first service provider in a provider database based on the approval indicated in the user input;
- determining topics that the service provider currently services based on the vector representative of the topic;
- identifying a topic that is related to the topics that the service provider currently services based on the vector representative of the topic and a vector representative of the topic that is related to the topics that the service provider currently services; and
- presenting the topic that is related to the topics that the service provider currently services to the service provider via the display.

15. The method of claim 14 wherein the one or more characters of text is derived from a transcript.

16. The method of claim 14 wherein the one or more characters of text is derived from a social media posting.

* * * * *